United States Patent [19]

Lene

[11] Patent Number: 5,176,166
[45] Date of Patent: Jan. 5, 1993

[54] INSULATING AND STABILIZING STRUCTURE FOR A FAUCET

[76] Inventor: Terry Lene, Rt. 7, Box 1059, Beaumont, Tex. 77713

[21] Appl. No.: 899,919

[22] Filed: Jun. 17, 1992

[51] Int. Cl.$^5$ .............................................. F16L 7/00
[52] U.S. Cl. ................................... 137/375; 137/301
[58] Field of Search ............... 137/301, 375; 248/76, 248/85, 87

[56] References Cited

U.S. PATENT DOCUMENTS

| | | | |
|---|---|---|---|
| 1,322,014 | 1/1919 | Hanna | 137/375 |
| 2,650,180 | 8/1953 | Walker | 137/375 |
| 2,721,764 | 10/1955 | Wilson, Jr. | 248/87 |
| 2,937,009 | 5/1960 | Anderson | 137/301 |

Primary Examiner—A. Michael Chambers
Attorney, Agent, or Firm—Richard L. Miller

[57] ABSTRACT

An insulating and stabilizing structure is provided for a faucet mounted on an unsupported vertical pipe extending upwardly from a pipe fitting on a horizontal pipe through the ground. The structure consists of an insulated sleeve to fit over a portion of the vertical pipe extending upwardly above the ground, so as to insulate it from the elements to prevent freeze up of water therein. A casing has an elongated slot extending upwardly from its lower end, so as to form two blades thereon. The casing fits over the insulated sleeve with the blades inserted into the ground until the top of the slot stops at the pipe fitting on the horizontal pipe, so as to retain in a stationary position the vertical pipe extending upwardly from the pipe fitting. A cap having a central hole fits over the top of the casing and the insulated sleeve to allow the top of the vertical pipe to extend through the central hole, so that the faucet can be connected thereto.

5 Claims, 1 Drawing Sheet

INSULATING AND STABILIZING STRUCTURE FOR A FAUCET

BACKGROUND OF THE INVENTION

The instant invention relates generally to protective housings for faucets but more specifically it relates to an insulating and stabilizing structure for a faucet.

Numerous protective housings for faucets have been provided in the prior art that are adapted to fit over and be retained to the faucets that extend from the sides of buildings, so as to prevent freezing of water within the faucets. For example, U.S. Pat. Nos. 2,686,530 to Dire; 4,103,701 to Jong and 4,244,394 to Hartselle III all are illustrative of such prior art. While these units may be suitable for the particular purpose to which they address, they would not be as suitable for the purpose of the present invention as hereafter described.

SUMMARY OF THE INVENTION

A primary object of the present invention is to provide an insulating and stabilizing structure for a faucet that will overcome the shortcomings of the prior art devices.

Another object is to provide an insulating and stabilizing structure for a faucet that will retain in a stationary position an unsupported vertical pipe extending upwardly through the ground that a faucet is mounted on.

An additional object is to provide an insulating and stabilizing structure for a faucet that will also insulate from the elements the vertical pipe extending upwardly through the ground that the faucet is mounted on, so as to prevent freeze-up of water therein as easily as would otherwise be the case without the instant invention.

A further object is to provide an insulating and stabilizing structure for a faucet that is simple and easy to use.

A still further object is to provide an insulating and stabilizing structure for a faucet that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

DESCRIPTION OF THE DRAWING FIGURES

The figures in the drawings are briefly described as follows.

DETAILED DESCRIPTION OF THE PREFERRED EMBODIMENTS

Figure 1:
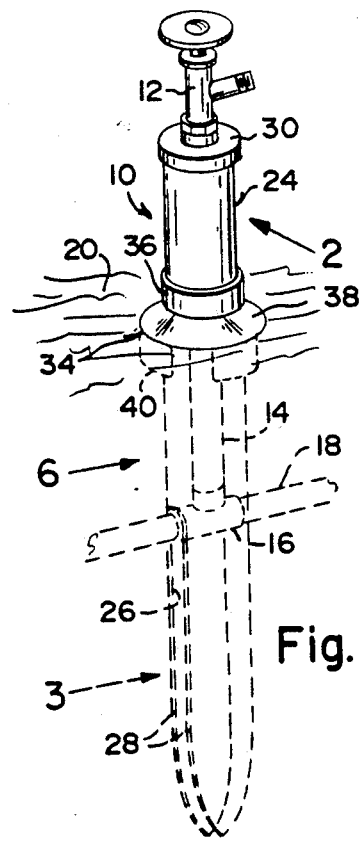
FIG. 1 is a diagrammatic perspective view illustrating the instant invention installed and ready for use.
Figure 2:
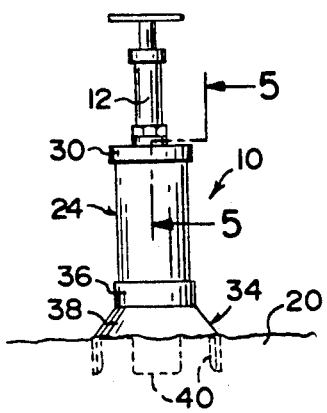
FIG. 2 is an elevational view taken in the direction of arrow 2 in FIG. 1 of mostly just the portion above ground.
Figure 3:
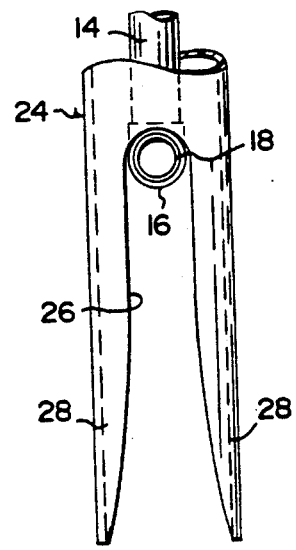
FIG. 3 is an elevational view with parts broken away taken in the direction of arrow 3 in FIG. 1 of the portion below ground.
Figure 4:
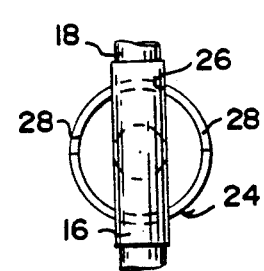
FIG. 4 is a bottom view taken in the direction of arrow 4 in FIG. 3.
Figure 7:
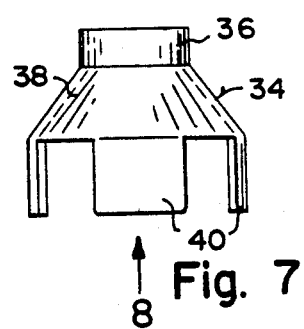
FIG. 7 is an elevational view of the weed inhibitor and stabilizer base member per se.
Figure 6:
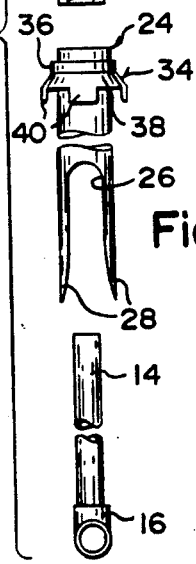
FIG. 6 is a view also with parts exploded taken in the direction of arrow 6 in FIG. 1.
Figure 5:
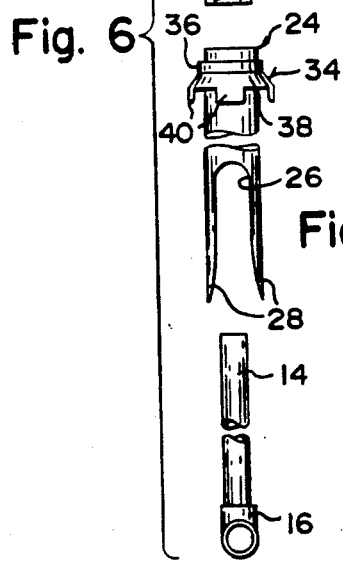
FIG. 5 is a cross sectional view with parts exploded taken on line 5—5 of FIG. 2.
Figure 8:
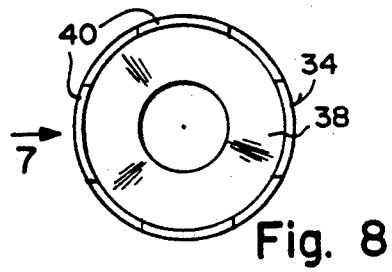
FIG. 8 is a bottom view taken in the direction of arrow 8 in FIG. 7.

Turning now descriptively to the drawings, in which similar reference characters denote similar elements throughout the several views, the Figures illustrate an insulating and stabilizing structure 10 for a faucet 12 mounted on an unsupported vertical pipe 14 extending upwardly from a pipe fitting 16 on a horizontal pipe 18 through the ground 20. The structure 10 consists of an insulated sleeve 22 to fit over a portion of the vertical pipe 14 extending upwardly above the ground 20, so as to insulate it from the elements to prevent or retard the freezing of water therein. A casing 24 has an elongated slot 26 extending upwardly from its lower end, so as to form two blades 28 thereon. The casing 24 fits over the insulated sleeve 22 with the blades 28 inserted into the ground 20 until the top of the slot 26 stops at the pipe fitting 16 on the horizontal pipe 18, so as to retain in a stationary position the vertical pipe 14 extending upwardly from the pipe fitting 16. A cap 30 having a central hole 32 is provided, in which the cap 30 fits over the top of the casing 24 and the insulated sleeve 22 to allow the top of the vertical pipe 14 to extend through the central hole 32, so that the faucet 12 can be connected thereto.

The insulating and stabilizing structure 10 further includes a weed inhibitor and stabilizer base member 34 which slides over the casing 24 below the cap 30 to the ground 20, so as to help stabilize the vertical pipe 14 and prevent weeds from growing around the casing 24.

The weed inhibitor and stabilizer base member 34 contains a collar 36 which fits over the casing 24. A conical flange 38 extends downwardly from the bottom of the collar 36. A plurality of fingers 40 are spaced apart and extend downwardly from the bottom of the conical flange 38, which are inserted into the ground 20.

The insulated sleeve 22 is fabricated out of thermal insulation material, while the casing 24, the cap 30 and the weed inhibitor and stabilizer base member 34 are all fabricated out of a strong durable material, typically but not limited to plastic and metal.

To install the insulating and stabilizing structure 10 the following steps should be taken:

1. Slip the insulated sleeve 22 over the vertical pipe 14.
2. Place the casing 24 over the insulated sleeve 22.
3. Push the blades 28 into the ground 20 until the top of the slot 26 reaches the pipe fitting 16.
4. Slide the weed inhibitor and stabilizer base member 34 over the casing 24.
5. Insert the fingers 40 into the ground 20.
6. Put the cap 30 over the top of the casing 24 and the insulated sleeve 22.
7. Attach the faucet 12 to the top of the vertical pipe 14 extending out of the central hole 32 of the cap 30.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An insulating and stabilizing structure for a faucet mounted on an unsupported vertical pipe extending upwardly from a pipe fitting on a horizontal pipe through the ground, said structure comprising:
   a) an insulated sleeve to fit over a portion of the vertical pipe extending upwardly above the ground, so as to insulate it from the elements to retard freezing of water therein;
   b) a casing having an elongated slot extending upwardly from its lower end, so as to form two blades thereon, said casing fits over said insulated sleeve with said blades inserted into the ground until the top of said slot stops at the pipe fitting on the horizontal pipe, so as to retain in a stationary position the vertical pipe extending upwardly from the pipe fitting; and
   c) a cap having a central hole in which said cap fits over the top of said casing and said insulated sleeve to allow the top of the vertical pipe to extend through the central hole, so that the faucet can be connected thereto.

2. An insulating and stabilizing structure as recited in claim 1, further including a weed inhibitor and stabilizer base member which slides over said casing below said cap to the ground, so as to help stabilize the vertical pipe and prevent weeds from growing around said casing.

3. An insulating and stabilizing structure as recited in claim 2, wherein said weed inhibitor and stabilizer base member includes:
   a) a collar which fits over the casing;
   b) a conical flange extending downwardly from the bottom of said collar; and
   c) a plurality of fingers spaced apart and extending downwardly from the bottom of said conical flange which are inserted into the ground.

4. An insulating and stabilizing structure as recited in claim 3, wherein said insulated sleeve is fabricated out of thermal insulation material.

5. An insulating and stabilizing structure as recited in claim 4, wherein said casing, said cap and said weed inhibitor and stabilizer base member are all fabricated out of a strong durable plastic.

* * * * *